(12) United States Patent
Lipscomb et al.

(10) Patent No.: US 8,813,683 B2
(45) Date of Patent: Aug. 26, 2014

(54) PET FOUNTAIN ASSEMBLY

(75) Inventors: John M. Lipscomb, Cedarburg, WI (US); Qing He, North Andover, MA (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 354 days.

(21) Appl. No.: 13/165,784

(22) Filed: Jun. 21, 2011

(65) Prior Publication Data

US 2011/0259273 A1    Oct. 27, 2011

Related U.S. Application Data

(63) Continuation-in-part of application No. 12/474,460, filed on May 29, 2009, now Pat. No. 8,381,685, and a continuation-in-part of application No. 12/887,439, filed on Sep. 21, 2010.

(60) Provisional application No. 61/356,874, filed on Jun. 21, 2010.

(51) Int. Cl.
*A01K 7/00*    (2006.01)

(52) U.S. Cl.
USPC .......................................................... 119/74

(58) Field of Classification Search
USPC ............................................... 119/74–80, 72
See application file for complete search history.

(56) References Cited

U.S. PATENT DOCUMENTS

| | | |
|---|---|---|
| 1,649,683 A | 11/1927 | Goodsman |
| 3,112,733 A | 12/1963 | Arnott |
| 5,501,178 A | 3/1996 | Kemp |
| 5,799,609 A | 9/1998 | Burns et al. |
| 5,842,437 A | 12/1998 | Burns |
| 6,055,934 A | 5/2000 | Burns et al. |
| 6,212,804 B1 | 4/2001 | Richard |
| 6,405,937 B1 | 6/2002 | Stukenberg |
| 6,450,122 B1 * | 9/2002 | Frank ............................ 119/259 |
| 6,460,483 B1 * | 10/2002 | Northrop et al. ................. 119/74 |
| 6,588,368 B1 | 7/2003 | Cheng |
| 6,622,657 B2 * | 9/2003 | Northrop et al. ................. 119/74 |
| 7,089,881 B2 * | 8/2006 | Plante ............................. 119/74 |
| 7,270,082 B2 | 9/2007 | Plante |
| 7,757,636 B2 | 7/2010 | McCallum et al. |
| 7,958,844 B1 * | 6/2011 | Northrop ........................ 119/74 |
| 8,171,885 B1 * | 5/2012 | Northrop et al. ................. 119/74 |
| 2005/0166853 A1 | 8/2005 | Plante |
| 2006/0174838 A1 | 8/2006 | Plante |
| 2006/0230676 A1 | 10/2006 | Rowe et al. |
| 2007/0095297 A1 | 5/2007 | Boyd |
| 2009/0078210 A1 | 3/2009 | Clark |
| 2010/0300366 A1 | 12/2010 | Lipscomb et al. |
| 2011/0067638 A1 | 3/2011 | Lipscomb et al. |
| 2012/0017839 A1 * | 1/2012 | Veness et al. .................... 119/74 |

* cited by examiner

*Primary Examiner* — Kristen C Hayes
(74) *Attorney, Agent, or Firm* — Boyle Fredrickson, S.C.

(57) ABSTRACT

A pet fountain having a basin and a cover overlying at least part of the basin and is supported by a sidewall of the basin and a pump disposed therebetween. The basin and cover have sidewall sections that converge to form a V-shaped locator arrangement that positions a coupling tube in communication with drinking bowl inlet of the cover so it is substantially coaxial with an outlet of the pump or pump module to telescopically engage the outlet. The basin can have an upraised shelf that holds a cord conduit providing a cord routing recess underneath. The shelf is disposed adjacent the V-shaped locator arrangement between an apex of the V-shaped locator arrangement and the pump or pump module minimizing the length of the cord run to the pump. In one embodiment, the V-shaped locator arrangement is formed by at least the basin having a raindrop or teardrop shape.

34 Claims, 9 Drawing Sheets

PET FOUNTAIN ASSEMBLY

CROSS-REFERENCE

This application claims the benefit under 35 U.S.C. §119(e) of U.S. Provisional Application Ser. No. 61/356,874, filed Jun. 21, 2010, the entirety of which is expressly incorporated herein by reference. This application is a continuation-in-part of U.S. application Ser. No. 12/474,460 filed May 29, 2009 now U.S. Pat. No. 8,381,685 and of U.S. application Ser. No. 12/887,439, filed Sep. 21, 2010, the entirety of each of which is expressly incorporated herein by reference.

FIELD

The present invention relates to a pet fountain and, more particularly, a pet fountain having a relatively simple construction that is configured to present circulating water in a manner that is naturally appealing to a pet, and that allows a pet to drink from different portions of the fountain.

BACKGROUND

Pet fountains that create flowing water for attracting pets are well known and there have been a number of commercially successful pet fountains. Exemplary pet fountains generally include a spout or other water-directing means for providing a continuous flow of water from a reservoir to a container such that the pet is able to drink either directly from the flowing water stream or from the container.

Some of the known pet fountains allow the water stream to free-fall from the spout when flowing from the container. These pet fountains can create a splash where the free-falling water stream enters a volume of "still" water in a container and/or can deflect from mouths or heads of pets while they drink directly from the free-falling water stream, creating drips or puddles on nearby floor surfaces. Stated another way, such free-falling pet fountains can, at least at times, be messy.

Other known pet fountains utilize multiple containers that are connected to each other at respective sides, or openings through such sides, to create a chain or series of containers arranged in a decreasing height order. This allows water to be pumped to the tallest container and then flow, by way of gravity, through the multiple containers, sequentially until the water is collected in the lowermost container. Such pet fountains can occupy a large amount of floor space since the multiple containers typically define an, at least somewhat, overall elongate structure. Some such pet fountains occupy relatively less floor space, but are rather tall and are configured to look like, for example, mountains or other geological forms, which may not fit with some modern or other decors.

Pet fountains use electronic pumps to draw water from the container and push the water through, at times a filter and then, the spout. Typical pumps have a grate or grill-like inlet and/or an integrated porous material.

These structures at the pump inlets typically prevent the pump from ingesting, for example, large pieces of debris, while leaving the pumps vulnerable to smaller particles that can cause wear of various internal pump mechanisms over time. Stated another way, known pumps do not have pre-filtering or pull-through filtering but, instead, usually push water through a "true" filtering device, if the water is being truly filtered at all. Furthermore, integrated grates, grills, or porous materials in typical pumps are not serviceable items, whereby their failures can require replacing the entire pump device.

It therefore would be desirable to provide a pet fountain that establishes a non-free-falling water stream and occupies only a small surface area upon a floor. It might also be desirable to provide pre-filtering or a pull-through filter feature to enhance performance and extend use lives of known pump devices. It might further prove desirable to provide pet fountains that do not appear awkward with respect to the decorating styles of the rooms in which they are used.

SUMMARY

The present invention is directed to a pet fountain that presents circulating water that is continuously filtered and pumped through the fountain. The fountain includes a basin that has a sidewall extending upwardly from a bottom wall and a cover or cover that is supported by the basin sidewall and overlies at least part of the basin. A pump assembly that can include just a pump is housed between the basin and cover, and circulates water through the pet fountain by pumping the water from the basin to an upper drinking bowl of the cover. The water spills out of the upper drinking bowl into a spillway which directs the water back to the basin. An opening is provided between the cover and the basin which allows a pet to drink directly from the basin in addition to the upper drinking bowl of the cover. The basin drinking opening is spaced from a spill-port defined between the basin sidewall and spillway end such that water from the spillway falls into the basin a distance away from the basin drinking opening. The spillway is angled and delivers water to an adjacent portion of the basin sidewall permitting drinking access by a pet to water flowing down the spillway during recirculating fountain operation.

The basin and cover includes seats that engage during assembly helping to ensure accurate location and mating engagement therebetween. The cover seat of the basin is formed of a cover seating surface bounded by a retainer that keeps the cover seated in the cover seat when the cover is mounted in the basin. The basin seat of the cover includes a bottom edge that rests or abuts on the cover seating surface when the cover is mounted on the basin. In a preferred embodiment, the cover seating surface of the basin is a ledge that cooperates with an upwardly extending retaining lip that forms the retainer bounding the cover seating surface and the portion of the cover received in the cover seat of the basin when the cover is mounted on the basin.

In one embodiment of the invention, the ledge and retaining lip extends from a top edge basin sidewall. The ledge may extend along at least one-half of the length of the basin sidewall, or may extend along the entire length of the basin sidewall, that is, along the entire perimeter of the basin. In another embodiment, the ledge is provided adjacent an opening at a top portion of the basin. The ledge may extend outwardly from the basin sidewall. This may allow the cover to sit upon the ledge and nest inside of a top portion of the basin sidewall that extends above the ledge.

The cover and basin have a pair of generally converging sidewall sections which can include corresponding cover or basin seats formed therein that define an angular locator arrangement that helps angularly locate the cover relative to the basin during mounting of the cover to the basin. In a preferred embodiment, the converging sidewall sections of one or both of the basin and cover each have at least one sidewall section with a seat, such as a basin or cover seat. The converging sidewall sections can form a generally V-shaped locator with the generally V-shaped locator of the cover registering with the generally V-shaped locator of the basin when the cover is being placed on the basin thereby helping locate the cover on the basin during assembly.

In another embodiment, the fountain can include a conduit through which an electrical cord of the pump assembly passes outside of the pet fountain. The conduit can be connected to a shelf that extends, for example, outwardly from the basin sidewall. Such a shelf can be formed of a portion of the cover locator. In a preferred embodiment the shelf is formed of an outwardly extending portion of the ledge of the cover seat of the basin that defines a cord clearance space or recess underneath. The shelf includes a cord conduit having a tube or other conduit that extends upwardly above the shelf having an open end underlying part of the cover when the cover is attached to the basin.

The fountain can include a basin drinking opening defined by a portion of the cover spaced from part of the basin sidewall exposing the interior of the basin along with water in the basin in a manner permitting a pet to drink therefrom. The drinking opening between the basin and cover is sized and configured to accommodate at least a portion of a head of a pet therein. The opening can define an area value that is at least about ⅛ of the total area of the pet fountain when viewed from a top plan view of the pet fountain. The opening can define an area that is less than about ½ of the total area of the pet fountain when viewed from a top plan view of the pet fountain. The width of the opening may vary along the length of the opening, from a wider portion to a tapering portion and the opening can be generally asymmetrical.

The fountain cover can be formed with a drinking bowl in fluid flow communication with a pump or pump module disposed between the basin and cover that allows water pumped by the pump from the basin to be delivered to the bowl where the water can be drank by a pet, e.g., cat or dog. The cover has a top wall in which the bowl is formed and includes a generally U-shaped channel sloping outwardly and downwardly from the bowl to adjacent a sidewall of the basin defining a spillway with a spill-port between the end of the spillway and basin sidewall allowing water flowing down the spillway to drain into the basin. The spill-port is spaced from the basin drinking opening so that water falling through the spill-port down into the basin does not distract a pet drinking water from the basin drinking opening.

In one fountain embodiment, the fountain may include a spill-port that receives water from the spillway and directs the water into the basin. The spill-port may be provided at a lowermost end of the spillway and may be defined between the cover and the basin sidewall or the ledge of the sidewall. A recess may extend into a side of the cover that defines at least a portion of a perimeter of the spill-port. The spill-port may have a width that varies with respect to a length thereon and may include a rounded portion that is relatively wider than a remainder of the spill-port.

In another embodiment, the cover includes a sidewall that extends upwardly from the basin. The cover may also include a cover top wall and wherein the upper drinking bowl extends into the cover top wall. The cover top wall may slope downwardly from the upper drinking bowl toward the basin sidewall.

In another embodiment, the spillway may define a channel that extends into the cover top wall. The spillway may direct the water so that the water is released tangentially with respect to the perimeter of the basin, which may contribute to establishing a circulating flow path of the water in the basin.

The fountain includes a pump that couples with a coupling tube attached to the cover prior to mounting of the cover to the basin. During mounting of the cover onto the basin, the respective seats of the basin and cover locate the cover relative to the basin with the generally V-shaped locators angularly locating the cover relative to the basin. As the cover is brought toward the basin and such location occurs as a result of the seats and generally V-shaped locators, the coupling tube is located relative to a discharge of the pump such that the end of the tube generally coaxially and telescopically receives part of the discharge. When the cover is received on the basin when cover mounting is complete and the coupling tube in telescoping engagement with the pump discharge, the engagement between the tube and pump discharge anchors the cover to the basin thereby helping to hold the cover against the basin.

In a preferred embodiment, the pump is part of a pump assembly that is of modular construction having a housing with an outlet nipple in fluid-flow communication with the pump discharge that telescopically couples with the coupling tube. The pump assembly can include a filter, such as a replaceable modular filter, and can be disassembled, such as when it is desired to remove and replace the filter.

In another embodiment, the pump assembly includes a filter such that the pump assembly continuously filters and circulates water through the pet fountain during use. The pump assembly may include at least one isolation mount that resiliently spaces the pump assembly from at least one of the basin and the cover. A first isolation mount may extend between the basin and the pump assembly and a second isolation mount may extend between the cover and the pump assembly. The isolation mount that extends between the cover and the pump assembly includes a passageway that conveys water from an outlet of the pump assembly to the upper drinking bowl.

In another embodiment, the pump assembly that extends between the basin and the cover may locate and/or support the cover at a location that is spaced from the outer perimeter of the cover. In another embodiment, the basin may have a capacity of at least about 45 fluid ounces, and can be at least about 60 fluid ounces. In another embodiment, at least one of the basin and cover is made from a stainless steel material. At least one of the basin and cover may be made from a ceramic material.

Objects, features, and advantages of the present invention include one or more of the following: provide a pet fountain that holds a relatively large volume of water, for example, at least about 45 fluid ounces or, preferably, at least about 60 fluid ounces; provide a pet fountain with a modern shape that may compliment a room décor; provide a pet fountain that provides multiple locations at which a pet can access drinking water; provide a pet fountain that is easy to clean and dishwasher safe; provide a pet fountain having a pump assembly with an easily replaceable charcoal and/or other filter; and provide a pet fountain that presents circulating water in a manner that is naturally appealing to a pet.

Various other features, advantages, and objects of the present invention will be made apparent from the following detailed description and the drawings.

BRIEF DESCRIPTION OF THE DRAWINGS

Preferred exemplary embodiments of the invention are illustrated in the accompanying drawings in which like reference numerals represent like parts throughout and in which.

DETAILED DESCRIPTION

Figure 1:
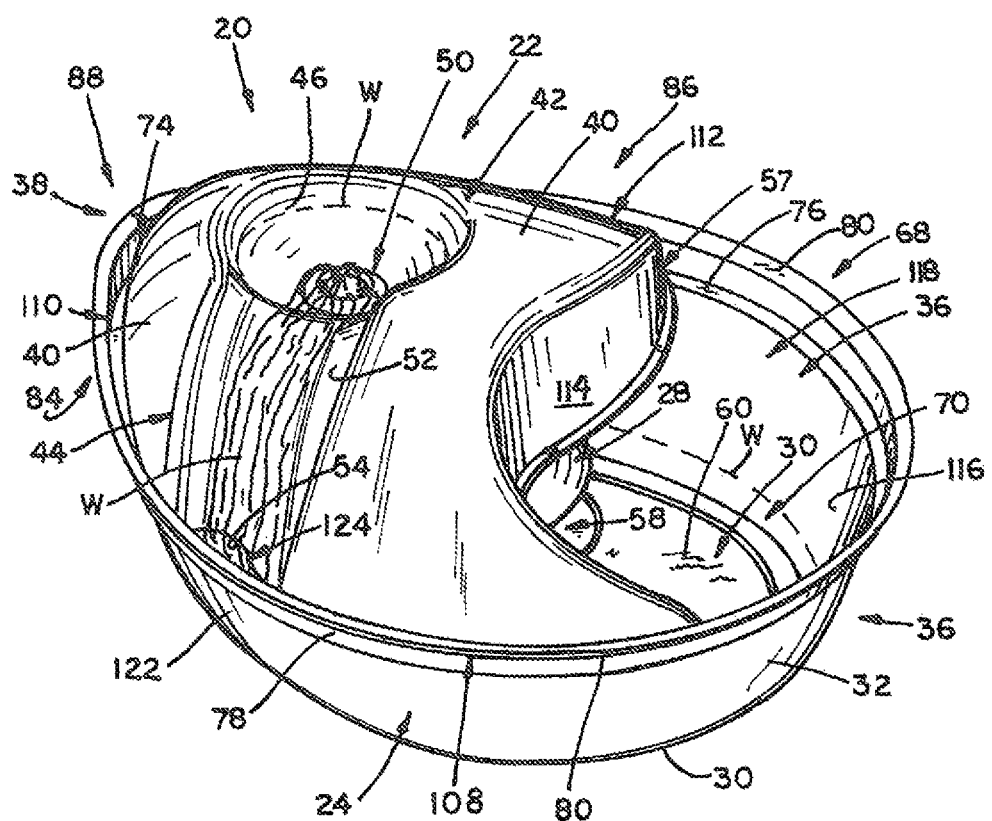
FIG. 1 is a top front perspective view of a preferred embodiment of a pet fountain assembly.

FIGS. 1-5 illustrate a pet fountain 20 constructed in accordance with the present invention. The fountain 20 is a fountain assembly 22 that includes a basin 24, an overlying fountain cover or cover 26, and a pump assembly 28 (FIG. 2) that circulates the water "W" through the fountain 20 so as to present the circulating water "W" in a manner that is naturally appealing to a pet, such as a cat. The fountain assembly 22 is advantageously simple, formed of minimal components, is easy to put together as components self locate during assembly, is easy to disassemble and clean, and operates in a relatively quiet manner recirculating water from the basin 24, to the cover 26, and back to the basin 24 enabling a pet, such as a cat, to drink from water, W, in the basin 24 as well as from water, W, pumped by the pump assembly 28 out the cover 26. The basin 24 and cover 26 can be made from dishwasher safe material that can be of antibacterial or anti-mold composition. In one embodiment, the basin 24 and cover 26 are made from metal, preferably a stainless steel. In another embodiment, the basin 24 and cover 26 are made of a ceramic material, e.g., porcelain, or the like.

Figure 2:
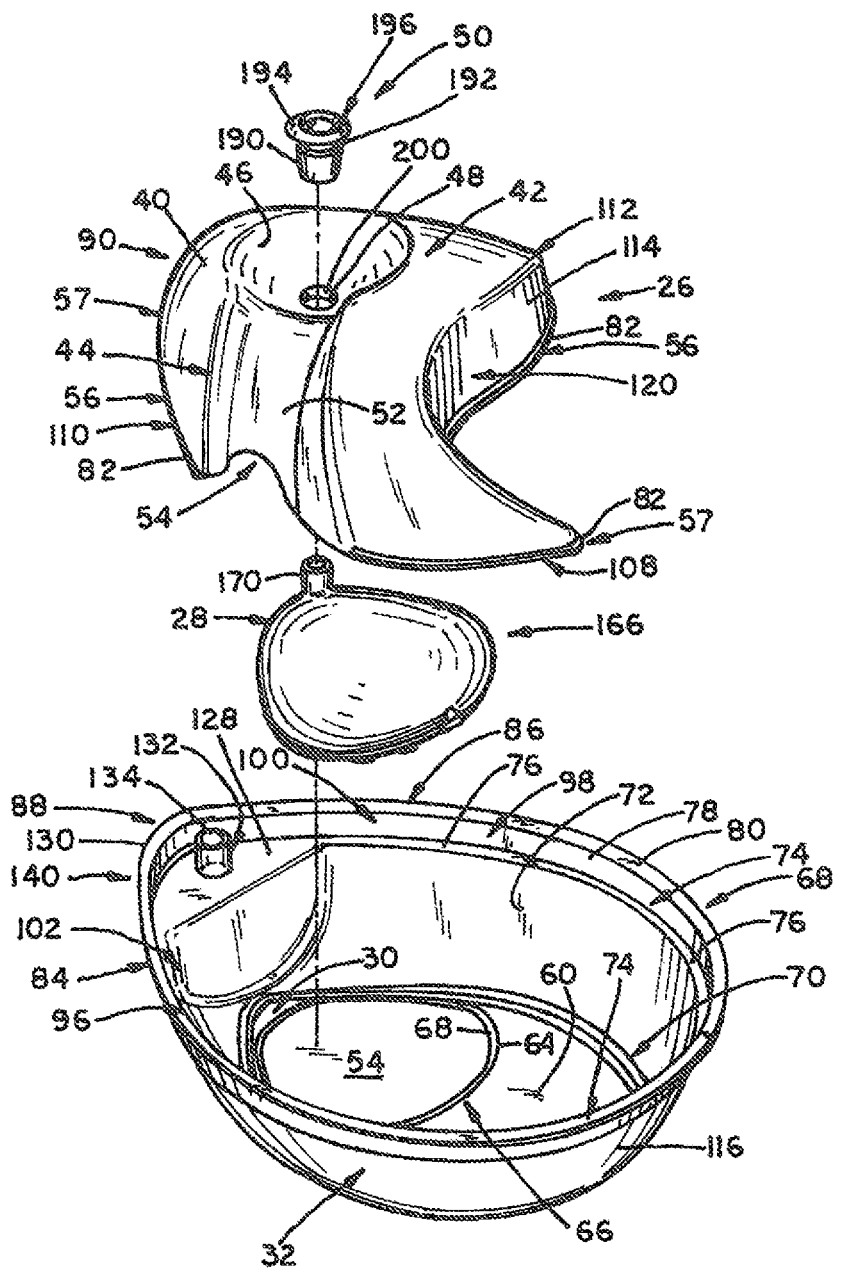
FIG. 2 is an exploded perspective view of the pet fountain assembly of FIG. 1.
Figure 3:
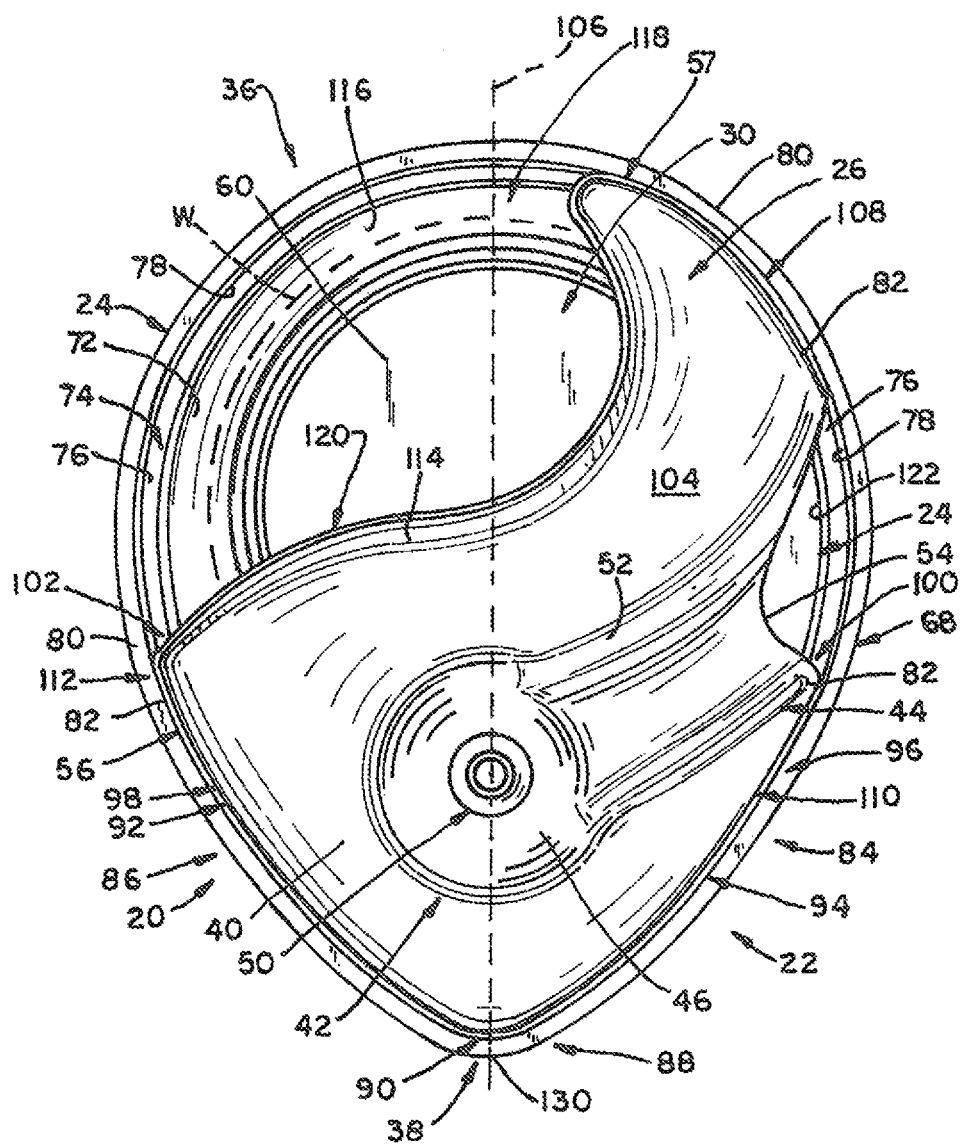
FIG. 3 is a top plan view of the pet fountain assembly.
Figure 4:
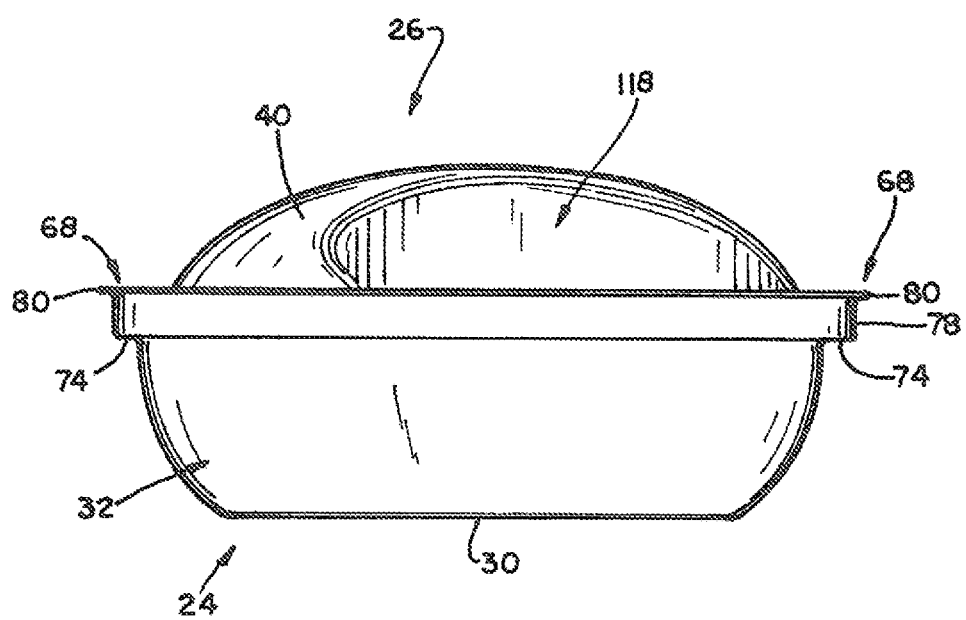
FIG. 4 is a front elevation view of the pet fountain assembly.
Figure 5:
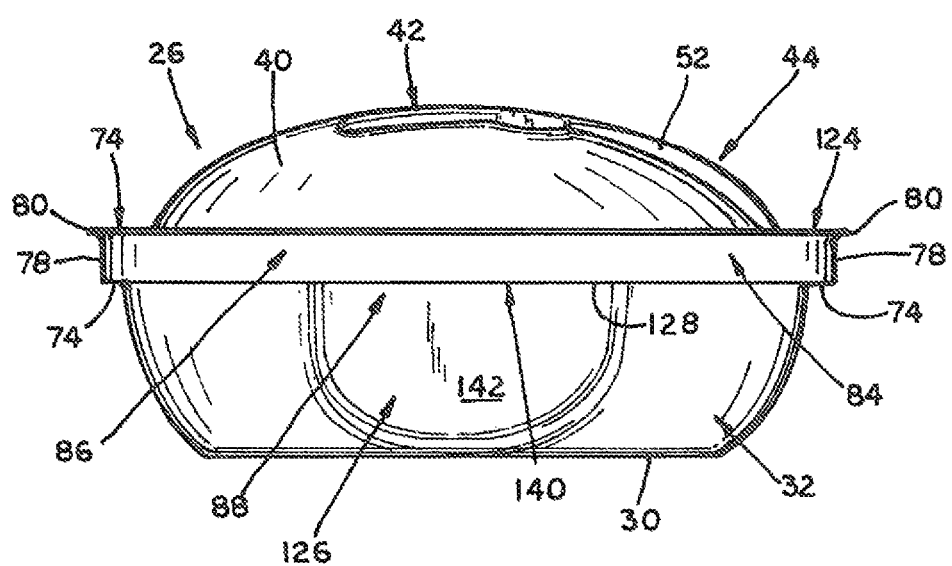
FIG. 5 is a rear elevation view of the pet fountain assembly.
Figure 6A:
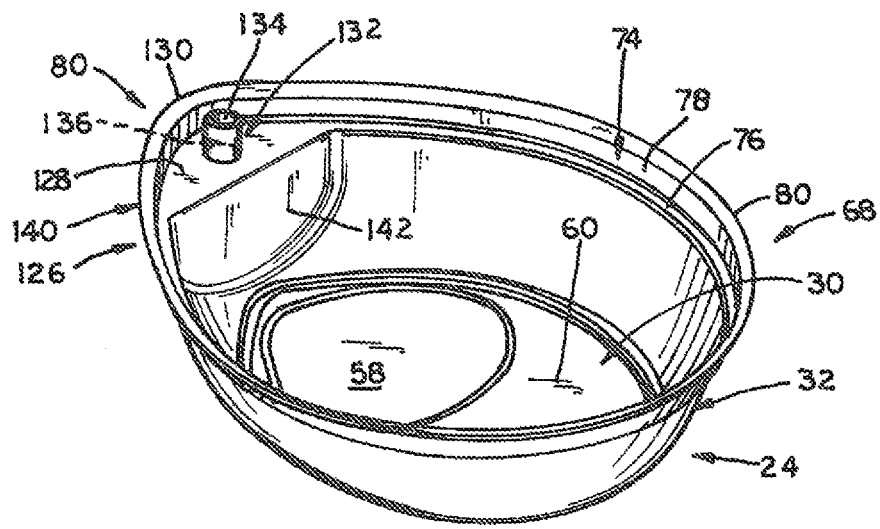
FIG. 6A is a top perspective view of one preferred embodiment of the pet fountain assembly.
Figure 6B:
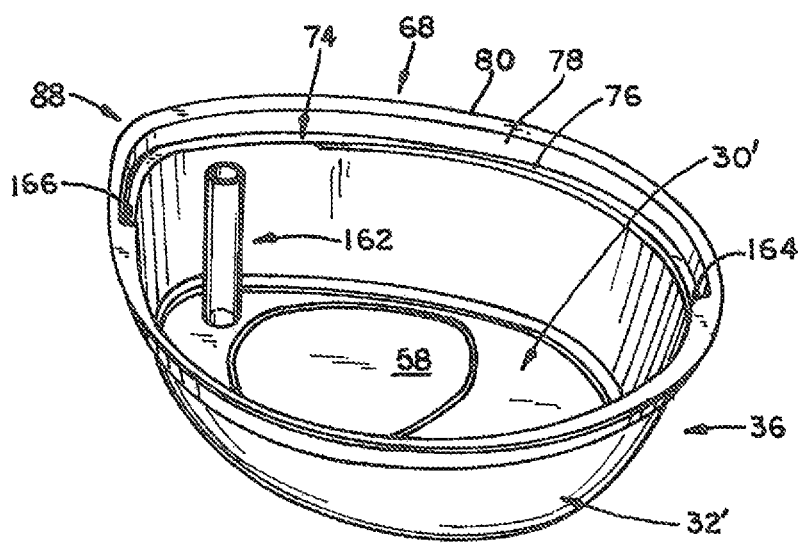
FIG. 6B is a top perspective view of another preferred embodiment of the pet fountain assembly.

Referring now to FIGS. 2 and 6A-6B, the basin 24 has a bottom wall 30 from which a sidewall 32 generally upwardly extends defining a water holding container 34 underlying the cover 26 in which water, W, collects during pet fountain operation. The bottom wall 30 and sidewall 32 define an oblong basin 24 that is substantially teardrop or raindrop shaped as shown in the drawings having a rounded end 36 opposite a tapered end 38. As is best shown in FIG. 3, the rounded end 36 can be curved, e.g., semicircular, and the tapered end 38 is generally V-shaped with the cover 26 being located by the tapered end 38 during fountain assembly. The bottom wall 30 is generally flat enabling the basin 24 to rest on a generally flat surface, such as a floor, a table or the like.

Basin 24 holds at least about forty five ounces of water and in at least one embodiment can hold at least about sixty ounces of water where intended for use by one or more cats. If desired, the bottom wall 30 and sidewall 32 can be configured to so the basin 24 can hold other volumes of water, such as based on the type or types of pets, e.g., dogs, that will be using the fountain 20 and their respective rates of water consumption, the particular desired refill frequency of the fountain 20, the desired size of the fountain 20 with respect to the overall size of the room in which the fountain 20 is used, and/or other factors.

With reference to FIGS. 1-3, the cover 26 has a three dimensionally formed top or outer wall 40 with a drinking bowl 42 integrally formed in the top wall 40 that is in fluid flow communication with an elongate spillway 44 along which water, W, flows during fountain operation. As best shown in FIG. 2, the drinking bowl 42 is formed by a recessed or concave bowl wall 46 having an opening or inlet 48 coupled via a tubular coupling or coupling tube 50 to the pump assembly 28 which is attached to the bottom wall 30 of the basin 24 anchoring the cover 26 to the basin 24 when fountain assembly is complete. As is best shown in FIG. 3, the spillway 44 is a generally U-shaped elongate channel 52 formed in the top wall 40 of the cover 26 that extends from the bowl 42 to an outlet or mouth 54 disposed alongside part of the basin sidewall 32 when the cover 26 is attached to the basin 24.

As is best shown in FIG. 2, the cover 26 has a bottom edge 56 that extends substantially about the periphery of the cover 26 but which is interrupted by an end or outlet 54 of the spillway 44. As explained in more detail below, the bottom edge 56 of the cover 26 defines a basin seat 57 that engages part of the basin 24 along a substantial portion of the basin sidewall 32 when the cover 26 is placed on the basin 24 in assembling the fountain 20. The bottom edge 56 of the cover 26 defines a basin seat 57 having an outturned flange 82 that rests on a portion of the basin 24 when the cover 26 is placed on the basin 24.

Referring now to FIGS. 1, 2, 6A and 6B, the bottom wall 30 of the basin 24 has a pump locator seat 58 formed in the bottom wall 30 configured to locate the pump assembly 28 during assembly of the fountain 20. The pump locator seat 58 is a pump locator formed in a top surface 60 of the bottom wall 30, such as by being molded or pressed into the bottom wall 30, having a perimeter shape that corresponds to that of the pump assembly 28. The pump locator seat 58 shown in the drawings is defined by a pair of spaced apart and generally parallel lines, ribs or ridges 62 and 64 molded into the top surface 42 of the bottom wall 30. The portion of the top surface 60 of the bottom wall 30 lying within the boundary defined by the pump locator seat 58 can be recessed relative to the portion of the top surface 60 of the bottom wall 30 surrounding or encompassing the pump locator seat 58. Where recessed, the pump locator seat 58 can define a depression 66 formed in the bottom wall 30 having a perimeter shape corresponding to that of the pump assembly 28 and configured to allow water to flow around and underneath the pump assembly 28. In use, the pump locator seat 58 indicates where a user of the pet fountain 20, such as a purchaser of the fountain 20, is to attach the pump assembly 28 to the bottom wall 30 of the basin 24 during fountain assembly.

The basin sidewall 32 extends upwardly from the basin bottom wall 30 and has a generally curved cross-section such that its top edge 68 is disposed outwardly of its bottom 70, e.g., sidewall bottom edge, where the sidewall 32 intersects the bottom wall 30. Such an outwardly curved cross-section smoothly guides water falling on an inner surface 72 of the sidewall 32 downwardly toward the pump assembly 28 in a manner that minimizes and preferably substantially prevents splashing.

The top edge 68 of the basin sidewall 32 is three dimensionally formed with a cover seat 74 defined by an outwardly extending ledge 76 configured to support part of the cover 26 placed on the basin 24 and an outer retaining lip 78 that extends upwardly from the ledge 76 along the outer periphery of the ledge 76. The outer retaining lip 78 is formed with an outturned cover guiding flange 80 having a curved cross-ssection that helps guide the basin seat 57 of the cover 26 into registry with the cover seat 74 of the basin 24 during assembly of the cover 26 to the basin 24. During cover assembly, the curved cover guiding flange 80 guides the bottom edge 56 of the cover 26 so the outturned flange 82 of the cover 26 ends up in abutment with the ledge 76 of the cover seat 74 of the basin 24 helping self locate the cover 26 relative to both the basin 24 and the pump assembly 28.

The tapered end 38 of the basin 24 is defined by a pair of converging segments 84 and 86 of the basin sidewall 32 that together with the corresponding portions of the cover seat 74 define a generally V-shaped cover locator 88 that registers with a substantially complementarily configured generally V-shaped basin locator 90 defined by a pair of converging segments 92 and 94 of the outer cover wall 40 and corresponding portions of the basin seat 57. In the preferred cover embodiment shown in the drawing figures, the generally V-shaped basin locator 90 is formed at least in part by a pair of elongate converging segments 96 and 98 of the basin seat 57, e.g., including it outturned flange 82, and the generally V-shaped cover locator 88 is formed at least in part by a pair of elongate converging segments 100 and 102 of the ledge 76 and retainer lip 78.

During assembly of the cover 26 to the basin 24, registry of the generally V-shaped basin locator 90 of the cover 26 with the generally V-shaped cover locator 88 of the basin 24, angularly locates the cover 26 relative to the basin 24 so the basin seat 57 of the cover 26 registers with the cover seat 74 of the basin 24 thereby guiding the outturned flange 82 of the cover 26 so it rests on the ledge 76 of the basin 24 and is bounded by the retainer lip 78. When the outturned flange 82 of the cover 26 is seated in the cover seat 74 of the basin 24, the retaining lip 78 encompassing the outturned flange 82 acts as a stop or abutment preventing side-to-side and front-to-back movement of the cover 26 relative to the basin 24. As a result of the generally V-shaped locators helping to locate the cover 26 relative to the basin 24 by angularly locating the cover 26 relative to the basin 24 as the cover 26 is placed on the basin 24, assembly of the cover 26 is relatively quick and simple.

As is best shown in FIG. 3, the cover 26 has a generally S-shaped leg 104 that extends generally diagonally and transversely across a longitudinal centerline 106 of the basin 24 that bisects the basin 24 such that first and second basin seating portions 108 and 110 of the cover 26 are disposed on one side of the centerline 106, e.g. right side of centerline 106, and seat in the cover seat 74 of the basin 24 along greater than 50% of the length of the basin sidewall 32 disposed on the same side of the centerline 106 and no more than substantially the entire length. The cover 26 has a third basin seating portion 112 opposite basin seating portions 108 and 110 disposed on the opposite side of the centerline 106, e.g., left side of centerline 106, that seat in the cover seat 74 of the basin 24 no greater than about 60% of the length of the basin sidewall 32 disposed on the opposite side of the centerline 106. As is shown in FIG. 3, the longitudinal center line 106 bisects the oblong or elongate basin 24 with the basin 24 being symmetrical about the center line 106.

With continued reference to FIG. 3, basin seating portions 108 and 110 are spaced apart by the spillway 44 with basin seating portion 108 seating in a portion of the cover seat 74 extending along part of the rounded end 36 of the basin 24 and basin seating portion 110 seating in a portion of the cover seat 74 extending along part of the tapered end 38 of the basin 24. Basin seating portions 108 and 110 engage between 50% and 90% of the cover seat 74 of the basin 24 on the same side of the centerline 106 as basin seating portions 108 and 110. Basin seating portion 112 extends uninterrupted along substantially the entire length of the cover seat 74 of converging basin sidewall segment 86 terminating at or about where the cover seat 74 extends along the rounded end 36 of the basin 24 on the same side of centerline 106 as basin seating portion 112.

The cover 26 has a generally complementarily configured generally S-shaped sidewall 114 spaced from an opposed exposed arcuate segment 116 of the basin sidewall 32 at the rounded end 36 opposite cover sidewall 114 defining an opening 118 large enough to provide direct drinking access to water, W, in the basin 24 for a pet, e.g., cat. The basin drinking opening 118 is defined by the exposed portion of the top surface 60 of the basin bottom wall 30 disposed between the cover sidewall 114 and the exposed arcuate segment 116 of the basin sidewall 32 extending from basin seating portion 108 of cover 26 to basin seating portion 112 of cover 26. The basin drinking opening defining cover sidewall 114 includes a downwardly extending skirt 120 disposed outwardly beyond the pump assembly 28 such that the cover 26 overlies the pump assembly 28 with the skirt 120 being generally located between the basin drinking opening 118 and the pump assembly 28 helping prevent direct access to the pump assembly 28 by a pet drinking from the basin drinking opening 118.

The spillway 44 is spaced from the basin drinking opening 118 and extends generally transversely relative to the longitudinally extending basin centerline 106 from the upper drinking bowl 42 to an adjacent opposed portion 122 of the basin sidewall 32 where the mouth 54 of the spillway 44 and the proposed basin sidewall portion 122 defining a spill-port 124 through which water, W, flows when exiting the spillway 44. As is best shown in FIG. 1, water, W, is pumped by the pump assembly 28 from the basin 24 upwardly into drinking bowl 42 where it pools until it reaches a level enabling water, W, to flow down the spillway 44. Water, W, exiting the bowl 42 flows down the spillway 44 until it reaches the mouth 54 of the spillway 44 where it falls downwardly through the spill-port 124 into the basin 24. The water, W, falling downwardly through the spill-port 124 can fall directly into water, W, in the basin 24 below with any upward splashing of the falling water obstructed by the relatively small open area provided by the spill-port 124. In other words, the portion of the cover 26 surrounding the spill-port 124 along with that portion of the basin sidewall 32 defining at least in part a portion of the spill-port 124 shield an animal drinking water, W, flowing down the spillway 44 from any splashing of the water, W, falling down the spill-port 124 into water in the basin 24 below.

In addition and which can be dependent on the level of the water, W, inside the basin 24, water, W, flowing down the spillway 44 during fountain operation can be directed downwardly into the basin 24 by the adjacent flow guiding portion 122 of the basin sidewall 32 including toward the pump assembly 28. The curved inner surface 72 of the basin sidewall 32 can also help direct water dropping down from the spill-port 124 defined by the spillway mouth 54 and adjacent portion 122 of the basin sidewall 32 extending alongside the spillway mouth 54 generally toward the pump assembly 28.

As is best shown by FIGS. 1 and 3, the mouth 54 of the spillway 44 is disposed at a height lower than the top edge 68 of the basin sidewall 32. In a preferred fountain assembly embodiment, the mouth 54 of the spillway 44 is disposed at substantially the same height as the ledge 76 of the cover seat 74 of the basin 24 such that the retaining lip 78 extends upwardly to a height greater than the spillway mouth 54 helping ensure water flowing down the spillway 44 into the spill-port 124 does not overflow the portion 122 of the basin sidewall 32 extending alongside the spillway mouth 54. If desired, the mouth 54 of the spillway 44 can be disposed at a height lower than an oppositely located portion of the adjacent ledge 76 of the basin sidewall 32.

Figure 7A:
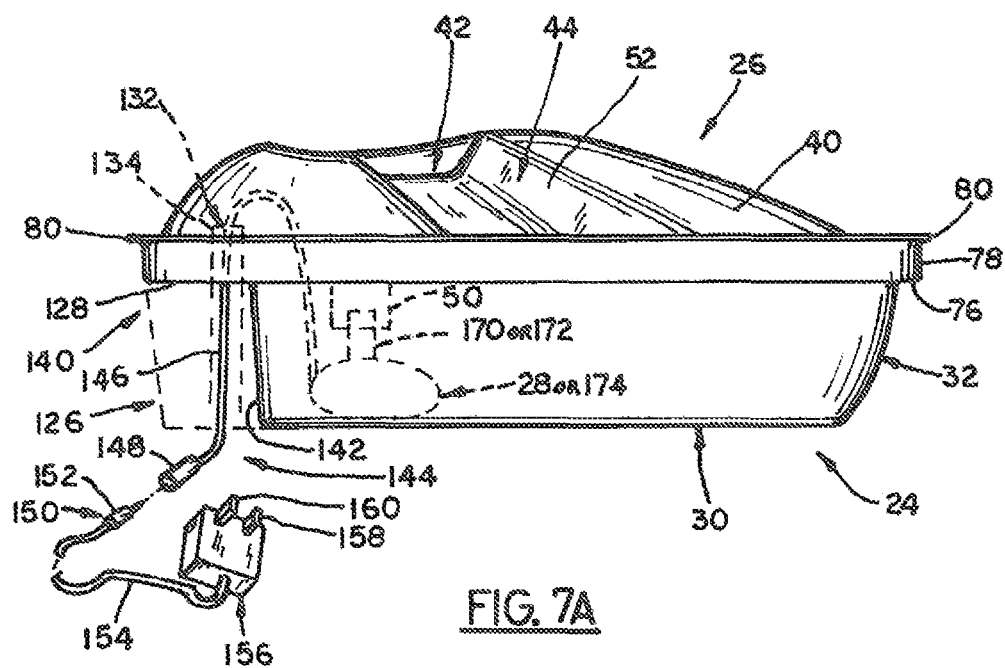
FIG. 7A is a side elevation view of the pet fountain assembly.
Figure 7B:
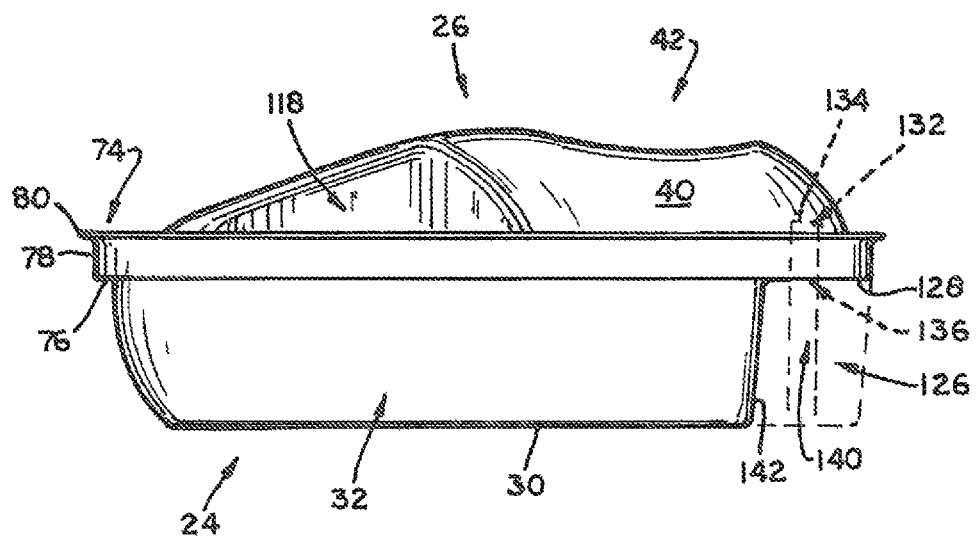
FIG. 7B is another side elevation view of the pet fountain assembly.

In a preferred embodiment of the basin 24 shown in FIGS. 2, 5, 6A, 7A and 7B, the basin 24 includes a generally horizontally and outwardly extending cord clearance space 126 defined by an outwardly extending shelf 128 formed of a portion of the cover seat 74 disposed along the apex 130 of the generally V-shaped cover locator 88 of the basin 24 that carries a cord conduit 132 and underlies part of the cover 26 that includes the generally V-shaped basin locator 90 of the cover 26 when the cover 26 is placed on the basin 24. The cord conduit 132 includes a section of tubing 134 in communication with an opening 136 through the shelf 128 that enables an electrical cord 138 connected to the pump assembly 28 to be routed through the cord conduit 132 and out the basin 24. As is best shown in FIGS. 7A and 7B, the shelf 128 provides an overhang 140 below which the cord clearance space 126 is disposed with the basin sidewall 32 having an endwall segment 142 also helping defining the cord clearance space 126.

The electrical cord 144 is shown in FIG. 7A as having one cord segment 146 that extends from the pump assembly 28 inside the fountain assembly 22 through the cord conduit 132 and out the basin 24 terminating in one half 148 of an electrical connector 150 that removably connects to an opposite half 152 of the electrical connector 150 that is attached to a second cord segment 154 connected to a transformer 156 having a plurality of prongs or terminals 158 and 160 coverable of being plugged into an electrical outlet having a voltage ranging from 110 volts alternating current (110 V AC) to 220 volts alternating current (220 V AC). The shelf 128 extends outwardly from an endwall section 146 of the basin sidewall 32 defining a cord clearance recess 148 underlying the shelf 128 outwardly of the basin endwall section 146. Such a cord clearance recess 148 advantageously enables ease of routing of the electrical cord 132 exiting the cord conduit 126 exteriorly of the basin 24.

Such a basin 24 equipped with a shelf 128 that defines an outwardly extending overhang 140 providing a cord clearance recess or space 126 underneath can be formed of metal, such as by being stamped of a stainless steel. In one preferred method of making the basin 24, the basin 24 is stamped, forged, or otherwise three dimensionally contoured using a conventional metal forming operation having the opening 136 formed with the basin 24 or in a subsequent forming operation before the cord conduit tube 134 is attached such as via welding or the like.

FIG. 6B is directed to another preferred embodiment of a basin 24' that lacks any shelf formed of a portion of the cover seat 74 formed in the top or outer peripheral edge 68 of the basin sidewall 32' such that the basin 24' also lacks any cord clearance recess or cord clearance space. The basin 24' includes an elongate tubular cord conduit 162 that extends upwardly from the bottom wall 30' through which an electrical cord, such as cord 144 shown in FIG. 7A, is threaded enabling the cord 144 to be electrically connected to a pump assembly 28 seated on the pump locator seat 58 inside the basin 24'. Basin 24' has an elongate cover seat 74 that terminates at one end 164 adjacent or alongside the rounded end 36 of the basin 24' and that terminates at an opposite end 166 adjacent or alongside the tapered end 38 of the basin 24'. As is shown in FIG. 6B, the end 164 of the cover seat 74 terminates on one side of the generally V-shaped cover locator 88 and the opposite end 166 of the cover seat terminates on the opposite side of the generally V-shaped cover locator 88. As is also shown by FIG. 6B, the cover seat 74 is elongate and extends continuously from one cover seat end 164 to the other cover seat end 166 along substantially one half the length of the basin sidewall 32' on one side of the longitudinal centerline, e.g., centerline 106 (FIG. 3). Such a basin 24' can be formed of a ceramic material, e.g., porcelain having the cord conduit 162 formed with the basin 24' or attached in a subsequent operation.

Figure 8:
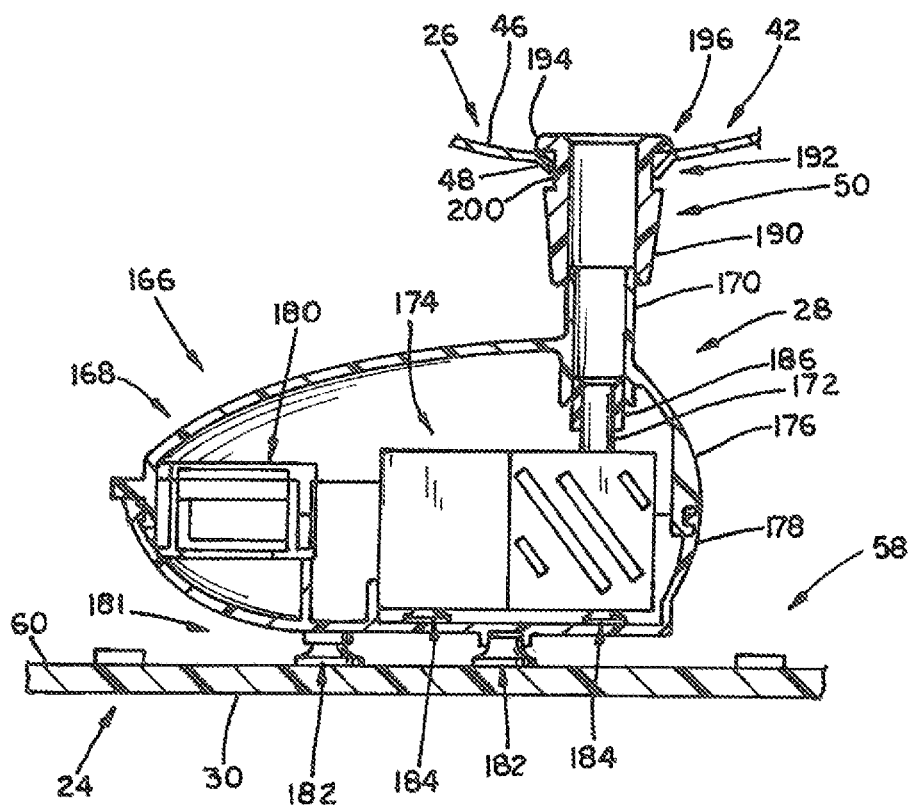
FIG. 8 is a fragmentary cross-sectional view of a pump and filter module assembly that anchors a cover of the pet fountain assembly to a base of the pet fountain assembly.

The pump assembly 28 can include just a pump, such as a submersible aquarium pump or the like, that releasably attaches to the bottom wall 30 of the basin 24 inside the pump locator seat 58 and anchors the cover 26 to the basin 24 via the coupling tube 50. If desired, the pump assembly 28 can be a modular assembly 166, such as is depicted in FIG. 8, which includes a housing 168 with an outwardly extending discharge nipple 170 in fluid flow registry with a discharge 172 of a pump 174, e.g. submersible aquarium pump, disposed within the housing 168. Housing 168 can be formed of a plurality of detachably connected halves 176 and 178 permitting the housing 168 to be opened to get access to the pump 174 and a replaceable filter module 180 disposed within the housing 168 downstream of a perforate intake grate 181 and upstream of the pump 174. Housing 168 is removably mounted by a plurality of flexible and resilient suction cups 182 to the top surface 60 of the basin bottom wall 30 within the pump locator target seat 58. Pump 174 is removably mounted by a plurality of flexible and resilient suction cups 184 to the bottom half 178 of the housing 168 in a manner that positions its discharge 172 in fluid flow communication with the discharge nipple 170 of the top half 176 of the housing 168. If desired, a sealing grommet or sleeve 186 can be disposed between the pump discharge 172 and the outlet nipple 170 of the housing 168.

With continued reference to FIG. 8, the coupling tube 50 has an elongate tubular body with a diametrically tapering outer wall 190 extending outwardly from a cover engagement seat 192 that is an annular radially inwardly extending groove or channel disposed between the end of the outer wall 190 and a radially outwardly extending lip 194 that provides a sealing grommet 196 that seals about the outer periphery of the bowl opening 48 when the coupling tube 50 is inserted into the opening 48 in the bowl 42 of the cover 26 during fountain assembly. Whether the tube 50 is used directly with a pump, such as pump 174 directly attached to the basin bottom 30 by suction cups 184, or used with a pump module or the like, such as pump module assembly 166 that houses the pump 174 within, the tube 50 not only provides a fluidic coupling between the pump 174 or pump module assembly 166 that not only locates the cover 26 relative to the basin 24 when the pump 174 or pump module assembly 166 is releasably mounted in the pump locator seat 58, the tube 50 works in concert with the suction cups 182 and/or 184 holding the pump 174 and/or pump module assembly 166 in place thereby anchoring the cover 26 to the basin 24.

As previously indicated, the pump, such as pump 174, can be used with coupling tube 50 to anchor the cover 26 to the basin 24 with the self-locating construction of the cover 26 and basin 24 helping align the end of the tube 50 so it seats on the discharge nipple 170 of the pump module housing 168, where a module 166 is employed, or seats on the pump discharge 172 when just a pump, e.g., pump 174, is used by itself such that the tube 50 is in fluid flow communication with water pumped out the discharge 172 of the pump 174 during recirculating fountain operation. The coupling tube 50 and/or pump module assembly 166 shown in FIGS. 1-3 and 8 can be constructed in accordance with that disclosed in presently co-pending and commonly owned U.S. application Ser. No. 12/887,439, filed Sep. 21, 2010, and published as U.S. Patent Appln. Pub. No. US 2011/0067638 A1, on Mar. 24, 2011, the entirety of which is expressly incorporated herein.

In assembly, the coupling tube 50, which is made of a flexible, resilient and elastomeric material, is inserted into the opening 48 in the drinking bowl 42 formed in the cover 26 with the free end of its diametrically tapering outer sidewall 190 being inserted first into the opening 48 in the bowl 42. The coupling tube 50 is manually urged through the opening 48 in the bowl 42 until opposite edges or the annular inner edge 200 defining the opening 48 is received in the annular groove or channel 192 formed in the tube 50 adjacent its outer lip 194 that provides a sealing grommet 196 about the periphery of the bowl opening 48 when the tube 50 is completely inserted.

The pump, e.g. pump 174, or pump module assembly 166 is releasably attached to the basin bottom wall 30 by releasably mounting it suction cups 182 or 184 in the pump locator seat 58 formed in the basin bottom wall 30. Thereafter, the cover 26 is maneuvered until its generally V-shaped basin locator 90 generally overlies the generally V-shaped cover locator 88 of the basin 24. The cover 26 is lowered toward the basin 24 until the basin seat 57 of the cover 26 approaches the cover seat 74 of the basin 24. Additional relative movement toward one another causes a portion of the outturned flange 82 of the cover 26 to contact and be guided by an adjacent portion of the retaining lip 78 of the basin 24 so the flange 82 of the cover 26 is directed into overlying abutment with the ledge 76 of the basin 24. During seating of the cover 26 with the basin 24, the outturned curved guide flange 80 of the retaining lip 78 of the basin 24 helps guide the outturned flange 82 of the cover 26 thereby locating the cover 26 in a side to side and/or front to back manner relative to the basin 24 during assembly.

As the cover 26 is being brought into contact with the basin 24, engagement between the generally V-shaped locators 88 and 90 angularly orients and locates the cover 26 relative to the basin 24 helping to ensure quick and easy and positive assembly of the cover 26 onto the basin 24. During assembly of the cover 26 to the basin 24, these plurality of simultaneously performing locator mechanisms not only locates the cover 26 relative to the basin 24 ensuring accurate assembly of the cover 26 onto the basin 24, they also ensure that the bottom or free end of the coupling tube 50 seats in fluid flow communication with the open end of the outlet nipple 170 of the pump module 166, where a pump module is used, or the open end of the discharge 172 of the pump 174. For example, in one preferred embodiment, the end of the tube 50 generally coaxially telescopically receives or telescopes over part of the pump discharge 172, where a pump is used alone, or generally coaxially telescopically receives or telescopes over part of the outlet nipple 170 of the pump module 166, where the pump 174 is disposed in a module 166. Frictional engagement between the coupling tube 50 and nipple 170 or discharge 172 along with the suction cup mounting force helps anchor the cover 26 to the basin 24 in a manner that holds the cover 26 against the basin 24.

The present invention is directed to a pet fountain that includes a basin having a bottom wall and a sidewall extending upwardly from the bottom wall defining a water holding container; a pump arrangement that pumps the water in the basin through the pet fountain; and a cover having a top wall from which a sidewall or bottom edge extends downwardly from the top wall, the cover carried by the basin and in fluid-flow communication with the pump arrangement. The pet fountain can also include where the basin sidewall has a pair of adjacent sidewall sections disposed at an angle relative one another that form a cover locator and the cover sidewall has a pair of adjacent sidewall sections disposed at an angle relative one another that form a basin locator that registers with the cover locator locating the cover relative to the basin when the cover is carried by the basin. The pet fountain can also include the adjacent basin sidewall sections converging to form a generally V-shaped cover locator, the adjacent cover sidewall sections converge to form a generally V-shaped basin locator, and the V-shaped cover locator of the basin registers with the V-shaped basin locator of the cover when the cover is placed on the basin locating the cover on the basin The pet fountain can also include the pump arrangement coupling the cover to the basin. The pet fountain can also include where the pump arrangement includes a pump disposed in the basin that underlies the cover. The pet fountain can also include the basin sidewall having a cover seat formed of a ledge and an upwardly extending retaining lip bounding the bottom portion of the ledge and wherein the cover sidewall has a bottom basin seat that rests on the ledge interiorly of the retaining lip. The pet fountain can also include where the cover has a spillway having an end terminating adjacent the basin sidewall forming a spill-port interrupting the bottom basin seat with the spill-port defined by the spillway and an adjacent portion of the basin sidewall and in fluid flow communication with the basin. The pet fountain can also include where the end of the spillway is disposed at a height lower than the retaining lip of the basin sidewall. The pet fountain can also include where the spillway is a generally U-shaped channel formed in the top wall of the cover. The pet fountain can also include the cover having an end wall spaced from a portion of the basin sidewall defining a watering bowl opening with the exposed portion of the basin sidewall that is spaced from the spill-port. The pet fountain can also include where the cover seat has a portion underlying the cover that extends outwardly of the basin sidewall defining a cord clearance space underneath and having a cord passage therethrough. The pet fountain can also include where a cord clearance space defining portion of the cover seat is formed by the ledge of the cover seat extends outwardly of the basin sidewall defining a shelf including a cord conduit providing the cord clearance space underneath. The pet fountain can also include where the cord conduit is formed by a tube in communication with an opening in the shelf. The pet fountain can also include where the basin has a cord clearance space defining shelf at a height greater than the basin bottom wall extending outwardly of the basin sidewall and having a cord routing opening therethrough defining a exteriorly disposed cord clearance space underneath. The pet fountain can also include where the cord clearance space defining shelf extends generally horizontally outwardly generally parallel to the basin bottom wall and underlies part of the cover carried by the basin. The pet fountain can also include where the basin sidewall has a pair of adjacent sidewall sections disposed at an angle relative one another that form a cover locator and the cover sidewall has a pair of adjacent sidewall sections disposed at an angle relative one another that form a basin locator that registers with the cover locator locating the cover relative to the basin when the cover is carried by the basin. The pet fountain can also include where the adjacent basin sidewall sections converge to form a generally V-shaped cover locator, the adjacent cover sidewall sections converge to form a generally V-shaped basin locator, and the V-shaped cover locator of the basin registers with the V-shaped basin locator of the cover when the cover is placed on the basin locating the cover on the basin The pet fountain can also include the basin sidewall includes a cover seat extending about a substantial portion of the periphery thereof that is formed of a ledge and an upwardly extending retaining lip bounding the bottom portion of the ledge, wherein the cover sidewall has a bottom basin seat that rests on the ledge interiorly of the retaining lip, and wherein the cord clearance space defining shelf has an upwardly extending portion of the ledge of the cover seat. The pet fountain can also include where the basin is oblong such as by being teardrop or raindrop shaped.

The invention can also be directed to a pet fountain assembly that includes a liquid holding basin having a bottom wall and a sidewall extending upwardly about the bottom wall including a cover seat with a generally V-shaped cover locator, a cover having a top wall and a basin seat formed along a bottom peripheral edge thereof includes of a generally V-shaped basin locator a pump arrangement disposed in the basin between the basin and cover coupling the cover to the basin; and wherein the cover is received on the basin when coupled by the pump arrangement to the basin with the basin seat of the cover in registry with the cover seat of the basin and the V-shaped cover locator of the basin in registry with the V-shaped basin locator of the cover. The pet fountain can also include where the cover seat of the basin includes a ledge and an upwardly extending retaining lip bounding the ledge and wherein the basin seat of the cover includes an edge that rests on the ledge interiorly of the retaining lip when the cover is received on the basin. The pet fountain can also include where the cover includes a spillway having an end terminating adjacent the basin sidewall forming a spill-port interrupting the basin seat of the cover with the spill-port in fluid flow communication with the basin defined by the spillway and an adjacent portion of the cover seat of the basin. The pet fountain can also include where the spillway is formed of a generally U-shaped channel formed in the top wall of the cover. The pet fountain can also include where the cover has an end wall spaced from an opposite portion of the basin sidewall defining a watering bowl opening therebetween that is spaced from the spill-port. The pet fountain can also include where the cover seat of the basin has a cord clearance space defining shelf at a height greater than the basin bottom wall extending outwardly of the basin sidewall and having a cord routing opening therethrough defining a exteriorly disposed cord clearance space underneath. The pet fountain can also include where the cord clearance space defining shelf extends generally horizontally outwardly generally parallel to the basin bottom wall and underlies part of the cover carried by the basin. The pet fountain can also include the generally V-shaped cover locator of the basin including a cord clearance space defining shelf at a height greater than the basin bottom wall extending outwardly of the basin sidewall and having a cord routing opening therethrough defining a exteriorly disposed cord clearance space underneath.

A pet fountain assembly including a basin having a bottom wall and a sidewall extending upwardly from the bottom wall defining a water holding container; a pump arrangement that pumps the water in the basin through the pet fountain; and a cover having a top wall from which a sidewall or bottom edge extends downwardly from the top wall, the cover carried by the basin and in fluid-flow communication with the pump arrangement. The pet fountain assembly can also include where the basin further has a ledge extending from the basin sidewall. The pet fountain assembly can also include where the ledge extends along at least one-half of the length of the basin sidewall. The pet fountain assembly can also include where the ledge extends along the entire length of the basin sidewall. The pet fountain assembly can also include where the ledge is provided adjacent an opening at a top portion of the basin. The pet fountain assembly can also include where the ledge extends outwardly from the basin sidewall. The pet fountain assembly can also include where the ledge further including a retaining lip extending from the ledge and at least partially locating the cover with respect to the basin. The pet fountain assembly can also include where the retaining lip extends upwardly beyond a lower edge of the cover. The pet fountain assembly can also include where the retaining lip is positioned outside of a lower edge of the cover. The pet fountain assembly can also include where the retaining lip extends generally orthogonally from the ledge. The pet fountain assembly can also include where the retaining lip extends upwardly from the ledge. The pet fountain assembly can also include where the retaining lip maintains a position of the cover with respect to the basin by at least one of transversely capturing and longitudinally capturing the cover. The pet fountain assembly can also include where the retaining lip transversely and longitudinally covertures the cover with respect to the basin. The pet fountain assembly can also include where a conduit through which an electrical cord of the pump assembly passes outside of the pet fountain. The pet fountain assembly can also include a shelf and wherein the conduit is connected to the shelf so as to allow the electrical cord of the pump to pass through the conduit and the shelf. The pet fountain assembly can also include where the shelf extends inwardly from the basin sidewall. The pet fountain assembly can also include where there is an opening defined between the basin and cover and being configured to accommodate at least a portion of a head of a pet therein. The pet fountain assembly can also include where the opening defines an area value that is at least about ⅛ of the total area of the pet fountain when viewed from a top plan view of the pet fountain. The pet fountain assembly can also include where the opening defines an area value that is less than about ½ of the total area of the pet fountain when viewed from a top plan view of the pet fountain. The pet fountain assembly can also include where a width of the opening varies with respect to a length of the opening. The pet fountain assembly can also include where the pump assembly includes a filter such that the pump assembly continuously filters and circulates water through the pet fountain during use. The pet fountain assembly can also include where the pump assembly further including at least one isolation mount that resiliently spaces the pump assembly from at least one of the basin and the cover. The pet fountain assembly can also include where a first isolation mount extends between the basin and the pump assembly and a second isolation mount extends between the cover and the pump assembly. The pet fountain assembly can also include where the isolation mount extending between the cover and the pump assembly includes a passageway that conveys water from an outlet of the pump assembly to the upper drinking bowl. The pet fountain assembly can also include where cover further including a cover sidewall that extends upwardly from the basin. The pet fountain assembly can also include where the cover further including a cover top wall and wherein the upper drinking bowl extends into the cover top wall. The pet fountain assembly can also include where the top wall slopes downwardly from the upper drinking bowl toward the basin sidewall defining a spillway. The pet fountain assembly can also include where the spillway defines a channel that extends into the cover top wall. The pet fountain assembly can also include where the spillway directs the water so that the water is released tangentially with respect to the perimeter of the basin.

The present invention is also directed to a pet fountain or fountain assembly having a basin having a bottom wall and a basin sidewall extending therefrom, the basin being adapted to hold water therein; a pump assembly that pumps the water into the basin through the pet fountain; a cover at least partially overlying the basin, the cover defining an outer perimeter thereof and including an upper drinking bowl that receives water from the pump; wherein at least a portion of the outer perimeter of the cover is supported by the basin sidewall and wherein a pump assembly extends between the basin and the cover so as to locate or support the cover at a location that is spaced from the outer perimeter of the cover. The pet fountain can also include where the cover further includes a spillway that directs water from the upper drinking bowl toward the basin. The pet fountain can also include a spill-port receiving water from the spillway and directing the water into the basin. The pet fountain can also include where the spill-port is provided at a lowermost end of the spillway. The pet fountain can also include where the spill-port is defined between the cover and the basin sidewall. The pet fountain can also include where the spill-port is defined between the cover and the ledge of the sidewall. The pet fountain can also include where there is a recess that extends into a side of the cover that defines at least a portion of a perimeter of the spill-port. The pet fountain can also include where the spill-port has a width that varies with respect to a length thereon. The pet fountain can also include where the spill-port includes a rounded portion that is relatively wider than a remainder of the spill-port.

It is also to be understood that, although the foregoing description and drawings describe and illustrate in detail one or more preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

It is claimed:

1. A pet fountain assembly comprising:
   a basin having a bottom wall and a sidewall extending upwardly from the bottom wall defining a water holding container;
   a pump arrangement that pumps the water in the basin through a pet fountain defined at least partially by the basin for presenting drinking water to a pet; and
   a cover having a top wall from which a sidewall or bottom edge extends downwardly from the top wall, the cover carried by the basin and in fluid-flow communication with the pump arrangement and including a recessed concave drinking bowl integrally formed in the top wall and receiving water from the pump arrangement for pooling of the water within the recessed concave drinking bowl for presenting the drinking water to the pet above at least a portion of the basin.

2. The pet fountain assembly of claim 1, wherein the basin sidewall has a pair of adjacent sidewall sections disposed at an angle relative one another that form a cover locator at a first end of the basin and the cover sidewall has a pair of adjacent sidewall sections disposed at an angle relative one another that form a basin locator at a first end of the cover that registers with the cover locator locating the cover relative to the basin when the cover is carried by the basin, and wherein the cover includes an end wall at a second end of the cover spaced from a portion of the basin sidewall defining a watering bowl opening exposing water in the basin for drinking by the pet at a location that is spaced from the recessed concave drinking bowl.

3. The pet fountain assembly of claim 1, wherein the basin sidewall comprises a cover seat formed of a ledge and an upwardly extending retaining lip bounding the bottom portion of the ledge and wherein the cover sidewall has a bottom basin seat that rests on the ledge interiorly of the retaining lip.

4. The pet fountain assembly of claim 3, wherein the cover seat has a portion underlying the cover that extends outwardly of the basin sidewall defining a cord clearance space underneath and having a cord passage therethrough.

5. The pet fountain assembly of claim 4, wherein cord clearance space defining portion of the cover seat is formed by the ledge of the cover seat extends outwardly of the basin sidewall defining a shelf comprising a cord conduit providing the cord clearance space underneath.

6. The pet fountain assembly of claim 1, wherein the basin has a cord clearance space defining shelf at a height greater than the basin bottom wall extending outwardly of the basin sidewall and having a cord routing opening therethrough defining a exteriorly disposed cord clearance space underneath.

7. The pet fountain assembly of claim 6, wherein the basin sidewall comprises a cover seat extending about a substantial portion of the periphery thereof that is formed of a ledge and an upwardly extending retaining lip bounding the bottom portion of the ledge, wherein the cover sidewall has a bottom basin seat that rests on the ledge interiorly of the retaining lip, and wherein the cord clearance space defining shelf comprises an upwardly extending portion of the ledge of the cover seat.

8. The pet fountain assembly of claim 6, wherein the cord clearance space defining shelf extends generally horizontally outwardly generally parallel to the basin bottom wall and underlies part of the cover carried by the basin.

9. The pet fountain assembly of claim 8, wherein the basin sidewall has a pair of adjacent sidewall sections disposed at an angle relative one another that form a cover locator and the cover sidewall has a pair of adjacent sidewall sections disposed at an angle relative one another that form a basin locator that registers with the cover locator locating the cover relative to the basin when the cover is carried by the basin.

10. The pet fountain assembly of claim 9, wherein the adjacent basin sidewall sections converge to form a generally V-shaped cover locator, the adjacent cover sidewall sections converge to form a generally V-shaped basin locator, and the V-shaped cover locator of the basin registers with the V-shaped basin locator of the cover when the cover is placed on the basin locating the cover on the basin.

11. The pet fountain assembly of claim 1, wherein the basin is oblong.

12. A pet fountain assembly comprising:
   a basin having a bottom wall and a sidewall extending upwardly from the bottom wall defining a water holding container;
   a pump arrangement that pumps the water in the basin through a pet fountain defined at least partially by the basin;
   a cover having a top wall from which a sidewall or bottom edge extends downwardly from the top wall, the cover carried by the basin and in fluid-flow communication with the pump arrangement; and
   wherein the basin sidewall has a pair of adjacent sidewall sections disposed at an angle relative one another that form a cover locator and the cover sidewall has a pair of adjacent sidewall sections disposed at an angle relative one another that form a basin locator that registers with the cover locator locating the cover relative to the basin when the cover is carried by the basin; and
   wherein the adjacent basin sidewall sections converge to form a generally V-shaped cover locator, the adjacent cover sidewall sections converge to form a generally V-shaped basin locator, and the V-shaped cover locator of the basin registers with the V-shaped basin locator of the cover when the cover is placed on the basin locating the cover on the basin.

13. The pet fountain assembly of claim 12, wherein the pump arrangement couples the cover to the basin.

14. The pet fountain assembly of claim 13, wherein the pump arrangement comprises a pump disposed in the basin that underlies the cover.

15. A pet fountain assembly comprising:
a basin having a bottom wall and a sidewall extending upwardly from the bottom wall defining a water holding container;
a pump arrangement that pumps the water in the basin through a pet fountain defined at least partially by the basin;
a cover having a top wall from which a sidewall or bottom edge extends downwardly from the top wall, the cover carried by the basin and in fluid-flow communication with the pump arrangement;
wherein the basin sidewall comprises a cover seat formed of a ledge and an upwardly extending retaining lip bounding the bottom portion of the ledge and wherein the cover sidewall has a bottom basin seat that rests on the ledge interiorly of the retaining lip; and
wherein the cover comprises a spillway having an end terminating adjacent the basin sidewall forming a spill-port interrupting the bottom basin seat with the spill-port defined by the spillway and an adjacent portion of the basin sidewall and in fluid flow communication with the basin.

16. The pet fountain assembly of claim 15, wherein the end of the spillway is disposed at a height lower than the retaining lip of the basin sidewall.

17. The pet fountain assembly of claim 16, wherein the spillway comprises a generally U-shaped channel formed in the top wall of the cover.

18. The pet fountain assembly of claim 15, wherein the cover has an end wall spaced from a portion of the basin sidewall defining a watering bowl opening with an exposed portion of the basin sidewall that is spaced from the spill-port.

19. A pet fountain assembly comprising:
a basin having a bottom wall and a sidewall extending upwardly from the bottom wall defining a water holding container;
a pump arrangement that pumps the water in the basin through a pet fountain defined at least partially by the basin;
a cover having a top from which a sidewall or bottom edge extends downwardly from the top wall, the cover carried by the basin and in fluid-flow communication with the pump arrangement;
wherein the basin sidewall comprises a cover seat formed of a ledge and an upwardly extending retaining lip bounding the bottom portion of the ledge and wherein the cover sidewall has a bottom basin seat that rests on the ledge interiorly of the retaining lip;
wherein the cover seat has a portion underlying the cover that extends outwardly of the basin sidewall defining a cord clearance space underneath and having a cord passage therethrough;
wherein the cord clearance space defining portion of the cover seat is formed by the ledge of the cover seat that extends outwardly of the basin sidewall defining a shelf comprising a cord conduit providing the cord clearance space underneath; and
wherein the cord conduit comprises a tube in communication with an opening in the shelf.

20. A pet fountain assembly comprising:
a liquid holding basin having a bottom wall and a sidewall extending upwardly about the bottom wall comprising a cover seat with a generally V-shaped cover locator;
a cover having a top wall and a basin seat formed along a bottom peripheral edge thereof comprised of a generally V-shaped basin locator;
a pump arrangement disposed in the basin between the basin and cover coupling the cover to the basin; and
wherein the cover is received on the basin when coupled by the pump arrangement to the basin with the basin seat of the cover in registry with the cover seat of the basin and the V-shaped cover locator of the basin in registry with the V-shaped basin locator of the cover.

21. The pet fountain assembly of claim 20, wherein the cover seat of the basin is comprised of a ledge and an upwardly extending retaining lip bounding the ledge and wherein the basin seat of the cover comprises an edge that rests on the ledge interiorly of the retaining lip when the cover is received on the basin.

22. The pet fountain assembly of claim 20, wherein the cover comprises a spillway having an end terminating adjacent the basin sidewall forming a spill-port interrupting the basin seat of the cover with the spill-port in fluid flow communication with the basin defined by the spillway and an adjacent portion of the cover seat of the basin.

23. The pet fountain assembly of claim 22, wherein the spillway comprises a generally U-shaped channel formed in the top wall of the cover.

24. The pet fountain assembly of claim 22, wherein the cover has an end wall spaced from an opposite portion of the basin sidewall defining a watering bowl opening therebetween that is spaced from the spill-port.

25. The pet fountain assembly of claim 20, wherein the cover seat of the basin comprises a cord clearance space defining shelf at a height greater than the basin bottom wall extending outwardly of the basin sidewall and having a cord routing opening therethrough defining a exteriorly disposed cord clearance space underneath.

26. The pet fountain assembly of claim 25, wherein the cord clearance space defining shelf extends generally horizontally outwardly generally parallel to the basin bottom wall and underlies part of the cover carried by the basin.

27. The pet fountain assembly of claim 20, wherein the generally V-shaped cover locator of the basin comprises a cord clearance space defining shelf at a height greater than the basin bottom wall extending outwardly of the basin sidewall and having a cord routing opening therethrough defining a exteriorly disposed cord clearance space underneath.

28. A pet fountain, comprising:
a basin having a bottom wall and a basin sidewall extending therefrom, the basin being adapted to hold water therein;
a pump assembly that pumps the water into the basin through a pet fountain defined at least partially by the basin for presenting drinking water to a pet;
a cover at least partially overlying the basin, the cover defining an outer perimeter thereof and including an upper drinking bowl defined by a bowl wall extending about a perimeter of the upper drinking bowl that receives water from the pump and is configured such the water pools within the upper drinking bowl for presenting the drinking water to the pet and spills out of the upper drinking bowl toward the basin;
wherein at least a portion of the outer perimeter of the cover is supported by the basin sidewall and wherein the pump assembly extends between the basin and the cover so as to locate or support the cover at a location that is spaced from the outer perimeter of the cover.

29. A pet fountain, comprising:

a basin having a bottom wall and a basin sidewall extending therefrom, the basin being adapted to hold water therein;

a pump arrangement that pumps the water in the basin through a pet fountain defined at least partially by the basin;

a cover at least partially overlying the basin, the cover defining an outer perimeter thereof and including an upper drinking bowl that receives water from the pump;

wherein at least a portion of the outer perimeter of the cover is supported by the basin sidewall and wherein a pump assembly extends between the basin and the cover so as to locate or support the cover at a location that is spaced from the outer perimeter of the cover, the cover further comprising a spillway that directs water from the upper drinking bowl toward the basin.

30. The pet fountain according to claim 29, further comprising a spill-port receiving water from the spillway and directing the water into the basin.

31. The pet fountain according to claim 30, wherein the spill-port is provided at a lowermost end of the spillway.

32. The pet fountain according to claim 31, wherein the spill-port is defined between the cover and the basin sidewall.

33. The pet fountain according to claim 32, wherein the spill-port is defined between the cover and the ledge of the sidewall.

34. The pet fountain according to claim 33, wherein a recess that extends into a side of the cover that defines at least a portion of a perimeter of the spill-port.

\* \* \* \* \*